(12) United States Patent
Quee et al.

(10) Patent No.: US 9,296,934 B2
(45) Date of Patent: Mar. 29, 2016

(54) ARTIFICIAL SNOW AND METHOD FOR MAKING SAME

(71) Applicant: Thomas FX Group Inc., North Vancouver (CA)

(72) Inventors: John Quee, West Vancouver (CA); Elizabeth Quee, West Vancouver (CA)

(73) Assignee: Thomas FX Group, Inc., North Vancouver, BC (CA)

( * ) Notice: Subject to any disclaimer, the term of this patent is extended or adjusted under 35 U.S.C. 154(b) by 0 days.

(21) Appl. No.: 13/910,842

(22) Filed: Jun. 5, 2013

(65) Prior Publication Data

US 2013/0264508 A1    Oct. 10, 2013

Related U.S. Application Data

(60) Division of application No. 12/885,335, filed on Sep. 17, 2010, now Pat. No. 8,470,192, which is a continuation-in-part of application No. 11/539,573, filed on Oct. 6, 2006, now abandoned.

(60) Provisional application No. 60/724,893, filed on Oct. 11, 2005.

(51) Int. Cl.
    *C08L 3/02*    (2006.01)
    *C09K 3/24*    (2006.01)

(52) U.S. Cl.
    CPC .... *C09K 3/24* (2013.01); *C08L 3/02* (2013.01)

(58) Field of Classification Search
    CPC .................................. C09K 3/04; C08L 3/02
    See application file for complete search history.

(56) References Cited

U.S. PATENT DOCUMENTS

| | | |
|---|---|---|
| 1,800,187 A | 4/1931 | Baumann |
| 2,466,369 A | 4/1949 | Bunderson |
| 2,594,725 A | 4/1952 | Britt |
| 3,041,187 A | 6/1962 | Jordan |
| 3,619,213 A | 11/1971 | Haynes et al. |
| 5,032,337 A | 7/1991 | Nachtergaele et al. |
| 5,106,890 A | 4/1992 | Maruhashi et al. |
| 5,322,866 A | 6/1994 | Mayer et al. |
| 5,362,778 A | 11/1994 | Famili et al. |
| 5,512,090 A | 4/1996 | Franke et al. |
| 5,632,152 A | 5/1997 | Miura et al. |
| 5,753,370 A | 5/1998 | Kambayashi et al. |
| 5,880,184 A | 3/1999 | Lazarus |
| 6,054,204 A | 4/2000 | Lazarus |
| 6,107,371 A | 8/2000 | Roesser et al. |

(Continued)

FOREIGN PATENT DOCUMENTS

AU           200021076       11/2001

OTHER PUBLICATIONS

CRC Handbook of Chemistry and Physics, 90th Edition, 2010, pp. 15-39; 7-9 through 7-13.

(Continued)

*Primary Examiner* — Liam J Heincer
(74) *Attorney, Agent, or Firm* — Schwabe Williamson & Wyatt

(57) ABSTRACT

A non-toxic, non-static, environmentally benign artificial snow product is made by extruding a mixture of starch, polyvinyl alcohol, hydrogenated soy flakes and talc to form an extruded starch product and processing the extruded starch product into snow flake like fragments. The snow flake like fragments may be sorted by size. Colorant may be added to yield artificial snow flakes in various festive colors.

12 Claims, 3 Drawing Sheets

(56) References Cited

U.S. PATENT DOCUMENTS

| | | |
|---|---|---|
| 6,277,899 B1 | 8/2001 | Bastioli et al. |
| 6,464,148 B1 | 10/2002 | Costa et al. |
| 7,005,168 B2 | 2/2006 | Verrall et al. |
| 7,235,594 B2 | 6/2007 | Han et al. |
| 7,326,743 B2 | 2/2008 | Yu et al. |
| 2001/0039303 A1 | 11/2001 | Loercks et al. |
| 2003/0006291 A1 | 1/2003 | Costa et al. |
| 2004/0009268 A1 | 1/2004 | Axelrod et al. |
| 2004/0192811 A1 | 9/2004 | Skuratowicz |
| 2006/0150281 A1 | 7/2006 | Guan et al. |
| 2006/0229207 A1 | 10/2006 | Mentink et al. |
| 2007/0130894 A1 | 6/2007 | Schultink et al. |
| 2008/0153958 A1 | 6/2008 | Ding et al. |

OTHER PUBLICATIONS

Talc Mineral Data (http://www.webmineral.com/data/Talc.shtml, 2010).

Maltrin® Maltodextrins Product Description (http://www.grainprocessing.com/pharm/maldescr.html, 2010).

Safety (MSDS) data for poly(vinyl alcohol) (http://msds.chem.ox.ac.uk/PO/poly(vinyl_alcohol), 2010).

Restriction Requirement mailed May 26, 2009 for U.S. Appl. No. 11/539,573.

Non Final OA mailed Sep. 10, 2003 for U.S. Appl. No. 11/539,573.

Final Office Action mailed Mar. 18, 2010, U.S. Appl. No. 11/539,573.

ARTIFICIAL SNOW AND METHOD FOR MAKING SAME

CROSS-REFERENCE TO RELATED APPLICATIONS

This application is a divisional of U.S. patent application Ser. No. 12/885,335, filed Sep. 17, 2010, entitled ARTIFICIAL SNOW AND METHOD FOR MAKING SAME, which is a continuation-in-part of U.S. patent application Ser. No. 11/539,573 filed Oct. 6, 2006, which claims priority to U.S. Provisional Patent Application No. 60/724,893 filed Oct. 11, 2005, the entire disclosures of which are hereby incorporated by reference.

TECHNICAL FIELD

This application relates to a composition for artificial snow which may be used, for example, for seasonal decoration, to adorn sets for theater and movie productions, and the like. The invention also relates to a method for making artificial snow.

BACKGROUND

Artificial snow is used for seasonal decoration of homes and businesses as well as for standing-in for real snow in theater productions, movie sets, and the like. Artificial snow may also be used in the production of advertisements and other commercial artwork. Preferably, artificial snow resembles natural snow in texture and color however, this is difficult to achieve.

Where the artificial snow is to be dropped from above or blown to simulate falling snow, it should drift in air relatively slowly in a manner that resembles the falling of natural snow. Artificial snow should ideally drift and lie on the ground in a way that closely resembles real snow.

Artificial snow is often displayed in places accessible to members of the public, for example, in seasonal displays in businesses, homes and the like.

SUMMARY

One aspect of the invention provides a non-toxic, environmentally benign artificial snow comprising fine fragments of a material extruded from a mixture comprising about 80% to 90% by volume starch; about 10% to 15% by volume polyvinyl alcohol; about 0.1% to 2.5% by volume talc; about 0.1% to 2.5% by volume hydrogenated soy flakes; and about 0% to 5% colorant by volume.

Another aspect of the invention provides a method for making artificial snow. The method comprises extruding starch, polyvinyl alcohol and talc to yield an extruded product; smashing the extruded product into fragments; and sorting the fragments by size.

Further aspects of the invention and features of various embodiments of the invention are set out below.

BRIEF DESCRIPTION OF THE DRAWINGS

In drawings which illustrate non-limiting embodiments of the invention.

DETAILED DESCRIPTION

Figure 1:
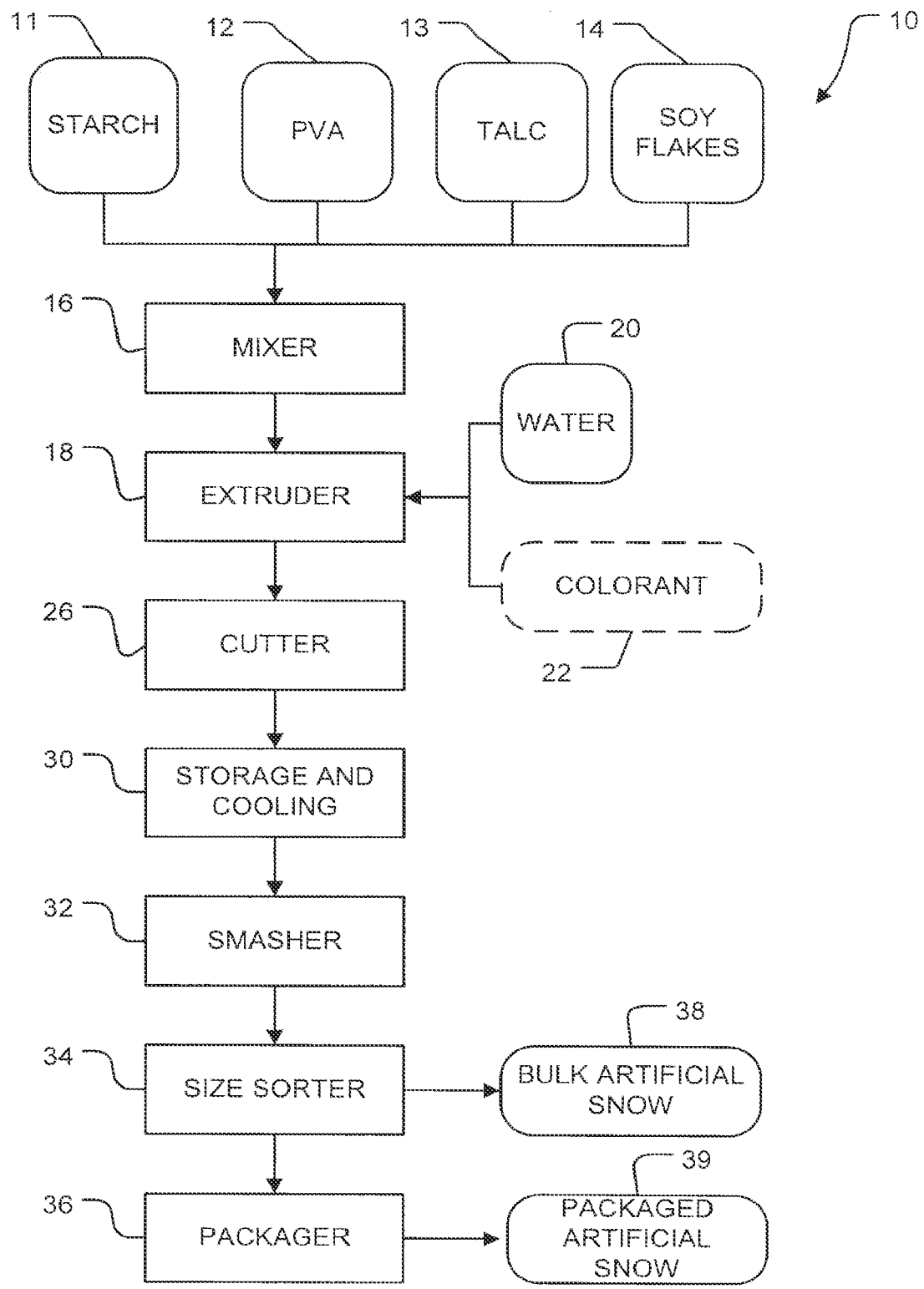
FIG. 1 is a block diagram of a production line for artificial snow according to an embodiment of the invention.

Embodiments of the present invention relate to methods and compositions for making artificial snow. In one embodiment, there is provided a composition for producing an artificial snow product that is non-toxic and environmentally benign. The composition comprises: (all percentages by volume also denoted as v/v): about 80% to 90% by volume starch; about 10% to 15% by volume polyvinyl alcohol; about 0.1% to 2.5% by volume talc; about 0.1% to 2.5% by volume hydrogenated soy flakes; and about 0% to 5% by volume colorant.

In a further alternative embodiment, the composition consists of (all percentages by volume also denoted as v/v): about 80% to 90% by volume starch; about 10% to 15% by volume polyvinyl alcohol; about 0.1% to 2.5% by volume talc; about 0.1% to 2.5% by volume hydrogenated soy flakes; and about 0% to 5% by volume colorant.

In another alternative embodiment, the composition consists essentially of (all percentages by volume also denoted as v/v): about 80% to 90% by volume starch; about 10% to 15% by volume polyvinyl alcohol; about 0.1% to 2.5% by volume talc; about 0.1% to 2.5% by volume hydrogenated soy flakes; and about 0% to 5% by volume colorant.

The percent by volume of the starch is typically in the range of from about 80% v/v to about 90% v/v. In one embodiment, the starch is present at about 80% v/v to about 85% v/v. In another embodiment, the percent by volume of the starch is from about 81% v/v to about 85% v/v. In yet another embodiment, the percent by volume of the starch is from about 82% v/v to about 85% v/v.

The starch may be provided in the form of vegetable starch such as potato starch or corn starch. In one embodiment, the starch is native potato starch. In an alternative embodiment, the starch is wheat starch.

The percent by volume of the polyvinyl alcohol is typically in the range of from about 10% v/v to about 15% v/v. In one embodiment, the polyvinyl alcohol is present at about 10% v/v to about 14% v/v. In another embodiment, the percent by volume of the polyvinyl alcohol is from about 11% v/v to about 14% v/v. In yet another embodiment, the percent by volume of the polyvinyl alcohol is from about 12% v/v to about 14% v/v.

The polyvinyl alcohol is preferably present in powder form. Even more preferably, the polyvinyl alcohol is finely powdered. The amount of polyvinyl alcohol is critical to produce an artificial snow product having a texture similar to that of natural snow and producing a product that will melt like natural snow on exposure to water. Using a greater amount of polyvinyl alcohol produces a heavier product that has a more plastic like consistency and does not breakdown easily and does not have the same characteristics of natural snow.

The percent by volume of the talc is typically in the range of from about 0.1% v/v to about 2.5% v/v. In one embodiment, the talc is present at about 0.5% v/v to about 2.5% v/v. In another embodiment, the percent by volume of the talc is from about 0.5% v/v to about 2% v/v. In yet another embodiment, the percent by volume of the talc is from about 1% v/v to about 2.5% v/v.

The percent by volume of the hydrogenated soy flakes are typically in the range of from about 0.1% v/v to about 2.5% v/v. In one embodiment, the hydrogenated soy flakes are present at about 0.5% v/v to about 2.5% v/v. In another embodiment, the percent by volume of the hydrogenated soy flakes is from about 0.5% v/v to about 2% v/v. In yet another embodiment, the percent by volume of the hydrogenated soy flakes is from about 1% v/v to about 2.5% v/v.

The amount of hydrogenated soy flakes is critical to the consistency of the composition. Adding a greater volume of hydrogenated soy flakes produces a composition that is wet and oily and is unsuitable for making an artificial snow product. The lack of hydrogenated soy flakes in the composition produces a composition that is dry and brittle and is unsuitable for making an artificial snow product.

The characteristics of the hydrogenated soy flakes provides an easy to mix quality that easily combines with the other components of the artificial snow composition to produce a composition that is easily extruded to produce an artificial snow product. The hydrogenated soy flakes need to be present in a dried form. Alternative soy-based liquids and semisolids are not suitable for use in the claimed artificial snow composition.

The percent by volume of the colorant is typically in the range of from about 0% v/v to about 5% v/v. In one embodiment, the colorant is present at about 0.5% v/v to about 5% v/v. In another embodiment, the percent by volume of the colorant is from about 1% v/v to about 5% v/v. In yet another embodiment, the percent by volume of the colorant is from about 1% v/v to about 4% v/v. In yet another embodiment, the percent by volume of the colorant is from about 2% v/v to about 4% v/v. In yet another embodiment, the percent by volume of the colorant is from about 1% v/v to about 3% v/v.

The colorant, which is optional in some embodiments, may be used to add a seasonal color to the artificial snow (for example, the artificial snow may be made to be pink, blue, green, black or the like as well as white). The colorant may also enhance the whiteness of the artificial snow in some embodiments. In one embodiment, black colored artificial snow is used to represent artificial volcanic ash.

The artificial snow composition produces a consistent artificial snow product that is environmentally benign and non-toxic. The claimed artificial snow composition overcomes problems encountered by other artificial snow products that use some materials which may be toxic, if ingested, and can also disturb the environment and have negative environmental impacts. Industrial dyes are not suitable for use in the claimed artificial snow composition.

The artificial snow composition produces natural like snow flakes forming cornices of different shapes and sizes similar to natural snow flakes. These natural-like snow flakes act and feel similar to natural snow flakes. In one embodiment, these natural-like snow flakes having a density between about 0.4-0.5.

The artificial snow composition, exits the extruder through a die opening having a specific diameter between about 1/16" to about 1/4". In one embodiment, the artificial snow composition exiting the extruder forms pellets about 1.5" to 2.0" long having an initial diameter of between about 1/16" to about 1/4" which expands after a period of time following cooling to a almost immediately to a diameter of between about 1/2" to about 3/4". The extruded starch mixture is cooled to cure and crystallize the cellular structure of the extruded starch mixture. The extruded starch mixture is then further processed via cutting and filtering to form artificial snow flakes.

FIG. 1 shows an example production line 10 for making artificial snow according to one embodiment of the invention. Production line 10 has a source of starch 11, polyvinyl alcohol 12, talc 13 and hydrogenated soy flakes 14. These materials are mixed, for example, in an electric mixer 16, and fed into an extruder 18.

Water mixture 20 is added in extruder 18 to achieve suitable extrusion of the starch mixture. In one embodiment, the starch mixture is extruded with a water saturation of up to about 5% or 15%. In another embodiment, the extruded starch has a water saturation in the range of about 13% to 15%. In another embodiment, the extruded starch has a water saturation in the range of about 10% to 15%. In one embodiment, the extrusion is performed through a die at a series of temperatures in the range of about 100° C. to about 200 and a pressure in the range of about 500 psi to about 750 psi.

In one embodiment, the extruder is a three barrel twin screw extruder, where each barrel heater is set at a different temperature. The composition passes through each barrel heater combination. The temperature of the first barrel is between about 100° C.-150° C., the temperature of the second barrel is between about 125° C.-175° C., and the temperature of the third barrel is between about 150° C.-200° C. As the temperature of each barrel increases, the pressure moving the composition through the extruder increases. The twin screw configuration allows for effective mixing of the ingredients of the artificial snow composition and enables the effective extrusion of the starch mixture.

The die configuration and screw configuration of the three barrel twin screw extruder is set to facilitate good mixing of the artificial snow composition. Many of the typical pieces of commercial extrusion equipment is a single screw configuration which is not suitable for the purpose of the claimed invention.

The resulting extruded starch material has a crisp outer skin and an internal cellular structure that is highly porous and irregular. The extruded starch has a density of approximately between 300 to 400 grams per cubic foot (in some embodiments 340 to 380 grams per cubic foot). In some embodiments, the extruded starch has the form of a somewhat irregular cylindrical extrusion roughly between about 1/16 inch to about 3/4 inch in diameter.

It is desirable to take steps to avoid the starch product from acquiring significant electrostatic charges from the time of extrusion. Where the starch product is carried from one place to another by entraining the starch product in a flow of air flow then the air flow should preferably be maintained at a relatively low velocity to avoid static buildup.

In some instances it is desirable to make colored artificial snow. Colored artificial snow may be used to create special visual images in theater or film productions. Colored artificial snow may also be used for seasonal decorations of various kinds. For example, pink or red snow could be used as part of Valentine's Day decorations; green artificial snow may be used for St. Patrick's Day decorations; pink, blue and yellow may be used for Easter-themed decorations; and so on.

Within a method for making artificial snow according to the invention, it is possible to add a colorant 22 to cause the artificial snow to be colored. In one embodiment, the colorant is food coloring where the food coloring is a suitable non-toxic colorant. A suitably colored food coloring may be mixed with the water injected in extruder 18 during the extrusion process to cause the extruded starch product to be colored. The amount of food coloring or other colorant 22 added can be selected to achieve a desired intensity of color. The amount of colorant should not be so great as to affect adversely the texture and quality of the extruded starch product.

In one embodiment, the extruded starch product, as extruded, is approximately between about 1/2 to 3/4 of an inch in diameter. The material is cut into small pieces in a first cutter 26. The cut material is conveyed to a storage hopper 30 (this may be done by carrying the cut extruded material in a stream of air while avoiding excessive air flow velocities to reduce the buildup of static electricity). The extruded starch product is allowed to cool to ambient temperature. In one embodiment, the first cutter 26 is integrated with extruder 18.

Figure 2A:
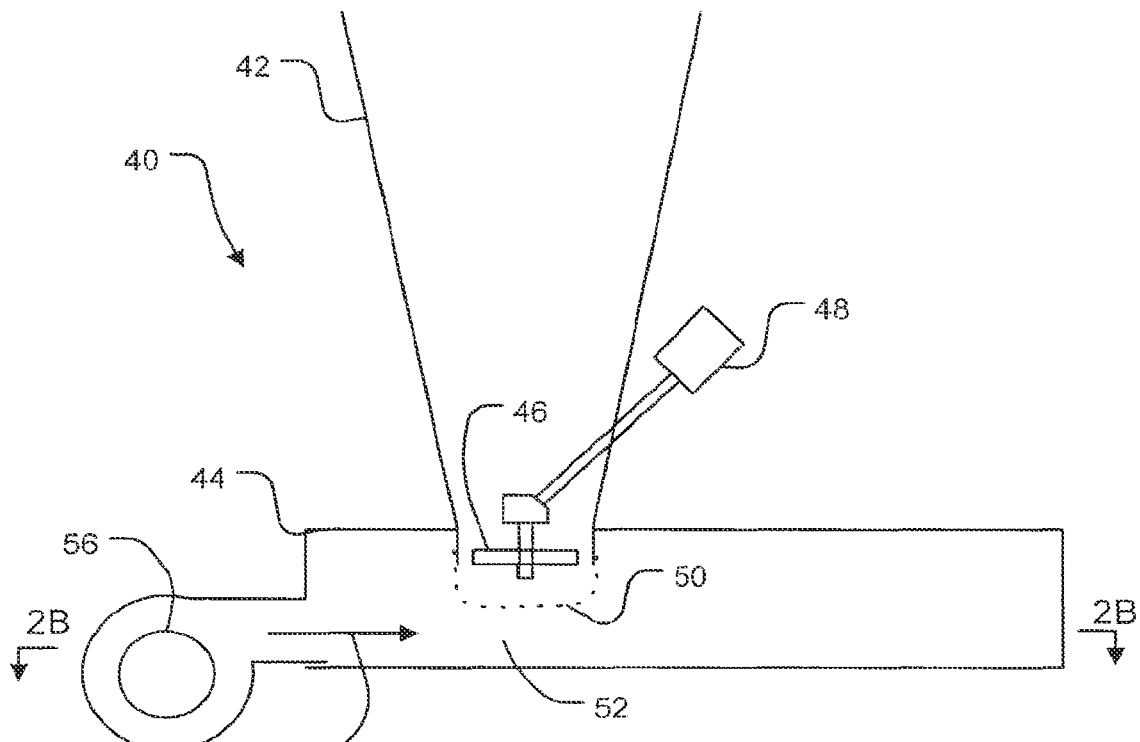
FIGS. 2A and 2B are respectively a partially schematic elevation sectional view and a partially schematic plan sectional view of a device for making artificial snow according to an embodiment of the invention.
Figure 2B:
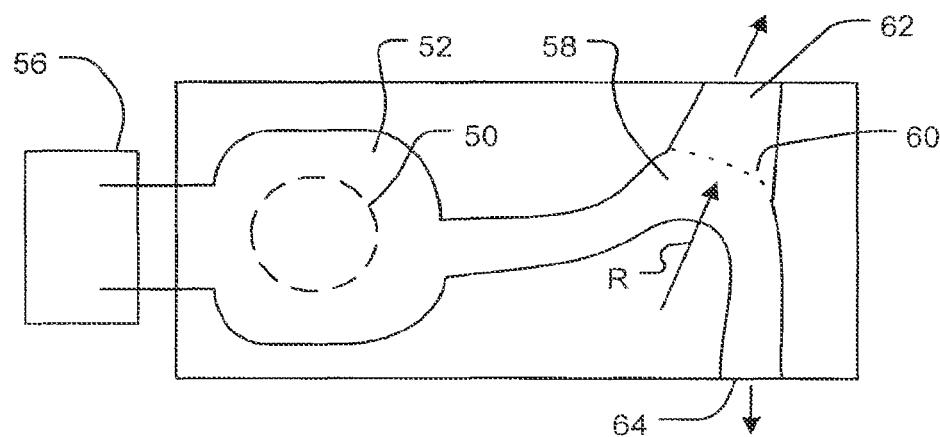

The extruded starch product is then processed to make artificial snow. In one embodiment, the extruded starch product is processed though a second cutter. In another embodiment, the extruded product is smashed. The smasher/cutter 32 produces fine snow flake like fragments which are then sorted. In one embodiment, the resulting fragments are sorted by size in a size sorter 34. FIGS. 2A and 2B are views of apparatus 40 that combines the functions of a smasher/cutter 32 and a size sorter 34.

In apparatus 40, the extruded starch product is dropped into hopper 42. The extruded starch product is allowed to fall past a blunt-edged blade 46 of approximately 6 to 8 inches in diameter rotating at a speed in the range of, for example, between about 6,000 to 10,000 rpm. As the extruded starch pieces fall past the rotating blade 46 they are smashed into small fragments. The fragments fall through a screen 50. The size of the apertures in screen 50 may be selected depending upon how coarse or fine it is desired to make the artificial snow. Larger apertures result in coarser artificial snow flakes. Smaller apertures result in finer artificial snow flakes. The screen 50 may, for example, have apertures in the range of between about ⅜ of an inch to about ¾ of an inch in size. Sorting the fragments by size may comprise removing fragments that are larger than or smaller than a threshold size from the fragments.

The starch fragments fall into a channel 52. The fragments are urged along the channel 52 by a flow of air 54 delivered by a blower 56. The air carries the particles along the channel 52 to an outlet 64. The channel 52 has a curved section 58 having a fine screen 60 around its outside periphery.

As very fine particles of starch pass the fine screen 60 they are expelled through the fine screen 60, where they can be collected at a separate outlet 62. In one embodiment, the fine screen 60 may have apertures on the order of about ⅛ of an inch in size, for example. The very fine particles which escape through the fine screen 60 may be used for specialty snow products as they will have a texture and appearance somewhat different from the coarser particles which pass by the fine screen 60 to the main outlet 64.

At the main outlet 64, the fragments of starch, which are now in a form suitable for use as artificial snow, are delivered to a packaging station 36 by a suitable conveyer, such as an auger, or the like. At the packaging station the artificial snow is packaged, either into boxes or other bulk storage containers to provide bulk artificial snow 38, or put into bags to provide packaged artificial snow 39 for the retail trade. Bagging may be performed by a suitable automatic bagging machine.

Because fine particles of artificial snow will tend to cling to surfaces that acquire static electrical charges, it is desirable to avoid the presence of any surfaces that can acquire a static electric charge. The conveyors and other apparatus in production line 10 are preferably made of metal, wood, or other materials that do not tend to acquire static charges. Metal components are preferably grounded. Air flows are preferably kept at relatively low velocities relative to any entrained artificial snow, extruded starch, or other artificial snow precursors to minimize the buildup of static electricity in the artificial snow or its precursors.

It has been found that a non-static artificial snow can be made by taking steps to minimize the buildup of static electricity throughout the processes described herein. Advantageously, preferred embodiments of such artificial snow can be displayed in displays in a way that appears natural and it can also fall, blow and move in air in a manner very similar to the way that natural snow falls, blows and moves in air.

Figure 3:
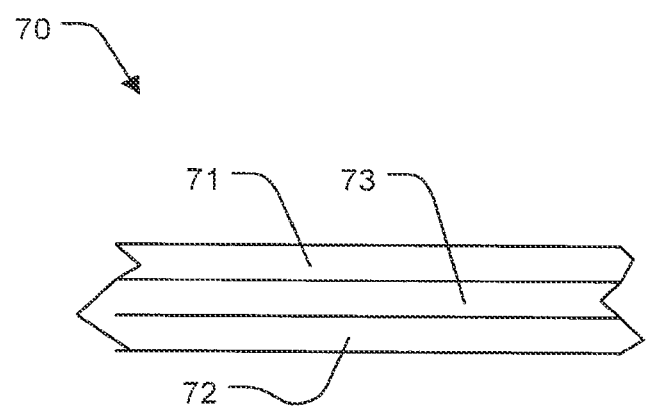
FIG. 3 is a cross-section through a bag for packaging artificial snow.

Further, it is desirable to package artificial snow in suitable non-static bags. One type of bag suitable for packaging artificial snow is shown in FIG. 3. Bag 70 is a laminated bag having an outer layer 71 of protective polypropylene, an inner layer 72 of polyethylene, and an anti-static layer 73 which is electrically conductive and dissipates any static charges which might otherwise attempt to collect on the bag.

While a number of exemplary aspects and embodiments have been discussed above, those of skill in the art will recognize certain modifications, permutations, additions and sub-combinations thereof. It is therefore intended that all such modifications, permutations, additions and sub-combinations be considered to be part of this invention. Accordingly, the scope of the invention is to be construed in accordance with the substance defined by the following claims.

We claim:

1. An artificial snow composition comprising an extruded, smashed mixture of about 80% to 90% by volume starch; about 10% to 15% by volume polyvinyl alcohol; about 0.1% to 2.5% by volume talc; about 0.1% to 2.5% by volume hydrogenated soy flakes; and 0% to 5% colorant by volume; wherein said composition comprises ⅛ to ⅝ inch screen-fiter passed, fine fragments of the mixture having a size, conformation and density comparable to snowflakes and which are non-toxic and environmentally benign.

2. An artificial snow composition according to claim 1 wherein the amount of starch is selected from the range of about 80% to 85% by volume.

3. An artificial snow composition according to claim 1 wherein the amount of polyvinyl alcohol is selected from the range of about 10% to 14% by volume.

4. An artificial snow composition according to claim 1 wherein the amount of talc is selected from the range of about 0.5% to 2.5% by volume.

5. An artificial snow composition according to claim 1 wherein the amount of talc is selected from the range of about 0.5% to 2.0% by volume.

6. An artificial snow composition according to claim 1 wherein the amount of hydrogenated soy flakes is selected from the range of about 0.5% to 2.5% by volume.

7. An artificial snow composition according to claim 1 wherein the amount of hydrogenated soy flakes is selected from the range of about 0.5% to 2.0% by volume.

8. An artificial snow composition according to claim 1 comprising a colorant.

9. An artificial snow composition according to claim 2 wherein the colorant is a food coloring.

10. An artificial snow composition according to claim 1, wherein said extruded, smashed mixture has a water saturation of about 5% to 15%.

11. An artificial snow composition according to claim 1 wherein said extruded, smashed mixture has a water saturation of about 10% to 15%.

12. An artificial snow composition according to claim 1 wherein said extruded, smashed mixture has a water saturation of about 13% to 15%.

* * * * *